United States Patent Office 3,439,079
Patented Apr. 15, 1969

3,439,079
MOLDING HOLLOW ARTICLES
Francis C. McDowell, Pittsfield, Mass., assignor to General Electric Company, a corporation of New York
No Drawing. Filed May 16, 1966, Ser. No. 550,118
Int. Cl. B29c 5/04
U.S. Cl. 264—102                6 Claims

ABSTRACT OF THE DISCLOSURE

A process is provided for preparing a hollow article of a thermoplastic polymer wherein the process requires partially filling a cavity with a thermoplastic polymer wherein the mold can be sealed and sealing the mold. A vacuum is then applied to the mold cavity and the thermoplastic polymer is heated to a temperature above its melting point while the mold is simultaneously rotated. The vacuum is released while the mold is rotated and the rotation is continued until a smooth continuous coating of the inner surfaces of the mold is obtained. The mold is then cooled and the molded article is removed therefrom. The above process is particularly adapted to preparing articles of an aromatic polycarbonate or a styrene homopolymer. The vacuum may be released to the atmosphere or to an inert gas.

---

The present invention relates to a process for preparing hollow molded articles of heat moldable thermoplastic polymers, which articles are free of voids and bubbles, and to products prepared therefrom.

It is an object of this invention to provide a process for preparing hollow molded articles free of voids and bubbles.

Still another object of this invention is to provide products prepared by the process herein described.

Other objects and advantages of this invention will become apparent from the following detailed description thereof.

Briefly, according to this invention, the foregoing and other objects are attained by the process of rotational molding of heat moldable thermoplastic polymers at a temperature above the temperature at which the thermoplastic polymer melts, which process requires first applying a vacuum to the mold cavity until the thermoplastic polymer melts and then releasing the vacuum. Rotating of the mold is continued until a uniform continuous coating of the inner surfaces of the mold is attained.

The following examples are set forth to illustrate more clearly the principle and practice of this invention to those skilled in the art. Unless otherwise specified where parts are mentioned, they are parts by weight.

Example I

To a heat resistant glass mold, such as Pyrex, containing an inner cavity of 1″ diameter by about 10″ long, which cavity can be sealed, add, by partially filling of the mold cavity, a finely divided 2,2-bis(4-hydroxyphenyl)-propane polycarbonate resin. The mold is sealed and a vacuum is applied to the inner cavity to a pressure equivalent to less than 50 mm. Hg. The mold is placed in a hot air oven and heated to about 650° F. while rotating the mold. When the resin melts, the vacuum is released to the atmosphere and rotation of the mold is continued until a uniform continuous coating of the inner surfaces of the cavity is attained. The mold is then cooled to room temperature and the molded tube removed.

The molded tube has a uniform thickness of about ⅛″ and is clear and free of bubbles or voids.

Example II

Example I is repeated except that a particulate styrene homopolymer having a Staudinger molecular weight of about 60,000 is employed herein in place of the particulate polycarbonate. The results obtained are the same as in Example I.

Example III

Example I is repeated except that the vacuum is not released to the atmosphere until removal of the mold from the oven. The resulting tube contains many voids and has a nonuniform surface.

Example IV

Example I is repeated except that a vacuum is not applied to the mold cavity. The mold is rotated while vented to the atmosphere. Upon melting of the resin and coating of the inner surface of the mold cavity, the mold is cooled to room temperature.

The molded tube contains many bubbles and has a nonuniform surface.

Example V

Examples III and IV are repeated except that a particulate styrene homopolymer having a Staudinger molecular weight of about 60,000 is employed herein place of the particulate polycarbonate resin.

The results obtained are the same as in Examples III and IV.

Example VI

Example I is repeated except that in place of the polycarbonate resin employed therein, finely divided cellulose acetate butyrate is employed herein. The temperature employed herein is 450° F. The results obtained are the same as in Example I.

The instant invention is directed to a process for molding hollow articles of heat moldable thermoplastic polymers. The process comprises (a) partially filling a cavity of a sealable mold with a heat moldable thermoplastic polymer, (b) sealing the mold, (c) applying a vacuum thereto, (d) heating the heat moldable thermoplastic polymer to a temperature above which the thermoplastic polymer melts, (e) releasing the vacuum and (f) rotating the mold until a uniform continuous coating of the inner surfaces of the mold is attained. Preferably, the mold is simultaneously rotated while heating the thermoplastic polymer to a temperature above which the polymer melts. In addition, as a further preferred embodiment in the practice of this invention, the vacuum is released to a pressure of at least equivalent to atmospheric pressure. In fact, the pressure may be in excess of atmospheric pressure if desirable. The vacuum applied to the mold cavity can generally be any vacuum depending upon the equipment available. It has been found that a vacuum equivalent to less than 500 mm. Hg is advantageous and preferably less than 200 mm. Hg.

The process of this invention produces hollow bodies which have a continuous uniform structure and which are free of voids and bubbles in the structure. The actual molding technique employed to prepare the hollow molded article is known as rotational molding. In rotational molding, seamless hollow bodies can be formed from plastics materials. The process requires heating and mold and simultaneously rotating the molds in two planes that are perpendicular to each other. The plastic or polymer particles melt on the inner surface of the hot mold and progressively fuse until the desired end product thickness is obtained. In rotational molding, cavity molds can be charged automatically or manually with predetermined amounts of material. Generally, the two halves of the molds are then clamped together and the charged molds are automatically placed in an oven where they are heated while being slowly rotated about two axis simultaneously. The revolving motion coats the inside of the mold forming the hollow object with the desired uniform wall thickness and cavity configuration. Generally, the wall thickness and weight of the finished molded item are determined by varying the amount of heat moldable thermoplastic polymer introduced into the cavity before heating. When the heat moldable thermoplastic polymer has melted and forms a homogeneous continuous coating of the inner surfaces of the cavity, the mold can be cooled either in a cooling chamber or by introducing cold water fog or a needle spray into the inner cavity. The molded article can then be removed from the mold.

The critical feature of the process of the instant invention is two-fold. The process requires first applying vacuum to the mold cavity, which vacuum is maintained during heating and melting of the heat moldable thermoplastic polymer, and then secondly releasing the vacuum to a pressure equivalent to at least atmospheric pressure. It may also be desirable to release the vacuum to an inert atmosphere since this would reduce oxidation of the polymer and the undesirable effects due to oxidation. As shown in the example, when employing a particular aromatic polycarbonate resin of a dihydric phenol under atmospheric pressures, the molded polycarbonate article has a high concentration of bubbles. Even when applying a vacuum as shown in the examples in an attempt to reduce the bubbles, the vacuum eliminates the bubbles but voids result. Therefore, as stated previously, the critical feature of the instant process is two-fold and requires first applying a vacuum and then releasing the vacuum and continuing rotation of the mold until a continuous uniform coating of the inner surfaces of the mold is attained.

In the practice of this invention, any heat moldable thermoplastic polymer material can be employed providing the thermoplastic polymer becomes fluid when heated to a temperature above that at which it melts and which will coat the inside surfaces of a mold cavity. An aromatic polycarbonate resin prepared from dihydric phenols and a carbonate precursor are employed most advantageously with the process of this invention. As shown in the examples, an aromatic polycarbonate resin of a dihydric phenol can be successfully molded by the instant process to produce a molded structure which is uniform and free of voids and bubbles. In the practice of this invention, the aromatic polycarbonate resin may be a homopolymer of a dihydric phenol, copolymers of two different dihydric phenols, or copolymers of such dihydric phenols with glycols, e.g., ethylene glycol or propylene glycol; dibasic acids, e.g., isophthalic or terephthalic acid; hydroxy terminated acids such as p-hydroxybenzoic acid or hydroxyl or acid-terminated polyesters, e.g., hydroxyl or acid-terminated polyesters of neopentyl glycol and adipic acid and include those disclosed in U.S. Patents 3,030,331 and 3,169,131, which are incorporated herein by reference.

In addition, a styrene polymer can also be employed advantageously with the process of this invention. The styrene polymer may be either a styrene homopolymer or styrene copolymers wherein the copolymer contains up to at least 50% of styrene with the balance thereof being at least one other monomer which is copolymerizable with styrene. Any styrene polymer may be employed herein providing that it is a heat moldable thermoplastic styrene polymer which is fluid when heated to a temperature above that at which it melts and which will coat the inner surface of a mold cavity.

Ethylene polymers can also be successfully molded by the novel process of this invention. These include high and low density ethylene homopolymers and copolymers thereof with other monomers which are copolymerizable therewith.

In the practice of this invention, any temperature can be employed providing it is a temperature which is at least above the temperature at which the heat moldable thermoplastic polymer melts. Preferably the temperature is at least 400° F. and can range from 400° F. up to about 900° F. However, the upper temperature will depend upon the particular polymer employed and its degradation properties.

The preferred state of the polymer to be employed in the practice of this invention is one which is in the finely divided form. The finely divided form or powdered form of the heat moldable thermoplastic polymer appears to be easier to handle and results in a more uniform product. However, larger or pellet size particulate thermoplastic polymers can be employed herein.

The advantages of the process of the instant invention are quite numerous since many different shapes can be obtained by the practice thereof. However, particularly useful are the production of transparent or translucent thermoplastic articles where clarity and uniform wall thickness are important. Rotational molding offers a very inexpensive way of providing and preparing excellent quality molded articles from thermoplastic heat moldable polymers.

It will thus be seen that the objects set forth above, among those made apparent from the preceding description, are efficiently attained and since certain changes may be made in carrying out the above process and in the composition set forth without departing from the scope of the invention, it is intended that all matters contained in the above description shall be interpreted as illustrative and not in a limiting sense.

What is claimed is:

1. A process for molding a hollow article of a heat moldable thermoplastic polymer, which process comprises (a) partially filling a cavity of a sealable mold with a heat moldable thermoplastic polymer, (b) sealing the mold, (c) applying a vacuum to the mold cavity, (d) heating the heat moldable thermoplastic polymer to a temperature above which the thermoplastic polymer melts while simultaneously rotating the mold, (e) releasing the vacuum while rotating the mold, (f) rotating the mold until a smooth continuous coating of the inner surfaces of the mold is attained, (g) cooling the mold and (h) removing the article.

2. The process of claim 1 wherein the vacuum is released to a pressure equivalent to at least atmospheric pressure.

3. The process of claim 1 wherein the heat moldable thermoplastic polymer is a particulate aromatic polycarbonate of a dihydric phenol.

4. The process of claim 1 wherein the polymer is a styrene homopolymer.

5. The process of claim 1 wherein the vacuum applied is equivalent to less than 500 mm. of mercury.

6. The process of claim 1 wherein the vacuum is released to an inert gaseous atmosphere.

References Cited

UNITED STATES PATENTS

| | | | |
|---|---|---|---|
| 2,911,678 | 11/1959 | Brunfeldt | 264—102 |
| 3,217,078 | 11/1965 | Kleiber | 264—310 |

ROBERT F. WHITE, *Primary Examiner.*

J. H. SILBAUGH, *Assistant Examiner.*

U.S. Cl. X.R.

264—310, 311; 18—26